United States Patent [19]
de Angel

[11] Patent Number: 5,787,029
[45] Date of Patent: Jul. 28, 1998

[54] ULTRA LOW POWER MULTIPLIER

[75] Inventor: Edwin de Angel, Austin, Tex.

[73] Assignee: Crystal Semiconductor Corp., Austin, Tex.

[21] Appl. No.: 782,527

[22] Filed: Jan. 10, 1997

Related U.S. Application Data

[63] Continuation of Ser. No. 356,054, Dec. 19, 1994, abandoned.

[51] Int. Cl.[6] .................................................. G06F 7/52
[52] U.S. Cl. .......................... 364/760.01; 364/760.02; 364/760.04; 364/757
[58] Field of Search .......................... 364/760, 759, 364/758, 757, 754, 707, 760.01, 760.02, 760.04

[56] References Cited

U.S. PATENT DOCUMENTS

| | | | |
|---|---|---|---|
| 4,745,570 | 5/1988 | Diedrich et al. | 364/760 |
| 4,891,779 | 1/1990 | Hasebe | 364/754 |
| 4,965,762 | 10/1990 | Williams | 364/760 |
| 4,982,355 | 1/1991 | Nishimura et al. | 364/707 |
| 5,010,510 | 4/1991 | Nishimura et al. | 364/707 |
| 5,128,890 | 7/1992 | Girardeau, Jr. | 364/757 |
| 5,200,912 | 4/1993 | Asghar et al. | |
| 5,333,119 | 7/1994 | Raatz et al. | 364/760 |

OTHER PUBLICATIONS

MacSorley, O.L., "High–Speed Arithmetic in Binary Computers," IRE Proc., vol. 49, pp. 67–91, Jan. 1961.

Booth, A.D., "A Signed Binary Multiplication Technique," Q. J. Mech. Appl. Math, vol. 4, pt.2, pp. 236–2404, 1951.

Wallace, C.S., "A Suggestion for a Fast Multiplier," IEEE Trans. Electron. Comput., vol. EC–13, pp. 14–17, Feb. 1964.

Dadda, L., "Some Schemes for Parallel Multipliers," Alta Freq., vol. 34, pp. 346–356, May, 1965.

Baugh, C.R. et al., A Two's Complement Parallel Array Multiplication Algorithm, IEEE Trans. Comput., vol. C–22, pp. 1045–1047, 1973.

Lu, Shih–Lien, "Implementation of Iteractive Networks with CMOS Differential Logic," IEEE Journal of Solid–State Circuits, vol. 23, pp. 1013–1017, 1988.

Yano, K.et al., "A 3.8–ns CMOS 16×16 –b Multiplier Using Complementary Pass–Transistor Logic," IEEE Journal of Solid–State Circuits, vol. 25, No. 2, pp. 388–395, 1990.

Lemonds, C. et al., "A Low Power 16 by 16 Multiplier Using Transition Reduction circuitry," Proceedings 1994 International Workshop on Low Power Design, pp. 139–142, 1994.

Dadda, L., "On Parallel Digital Multipliers," Alta Freq., vol. 45, pp. 574–580,1976.

Lehman, M., "Short–Cut Multiplication and Division in Automatic Binary Computers," IEE Proceedings, 105:496–544, 1958.

Jullien, G.A., "High Performance Arithmetic for DSP Systems," VLSI Signal Processing Technology, Kluewer, Boston, Chpt. 3, 1994.

Primary Examiner—David H. Malzahn
Attorney, Agent, or Firm—Robert D. Lott; J. P. Violette

[57] ABSTRACT

A multiplier using a modified Booth algorithm dissipates power proportional to the magnitude of one of the operands, and logic races are eliminated using iterative networks.

20 Claims, 13 Drawing Sheets

| FIG. 2A | FIG. 2B | FIG. 2C |
| --- | --- | --- |
| FIG. 2D | FIG. 2E | FIG. 2F |

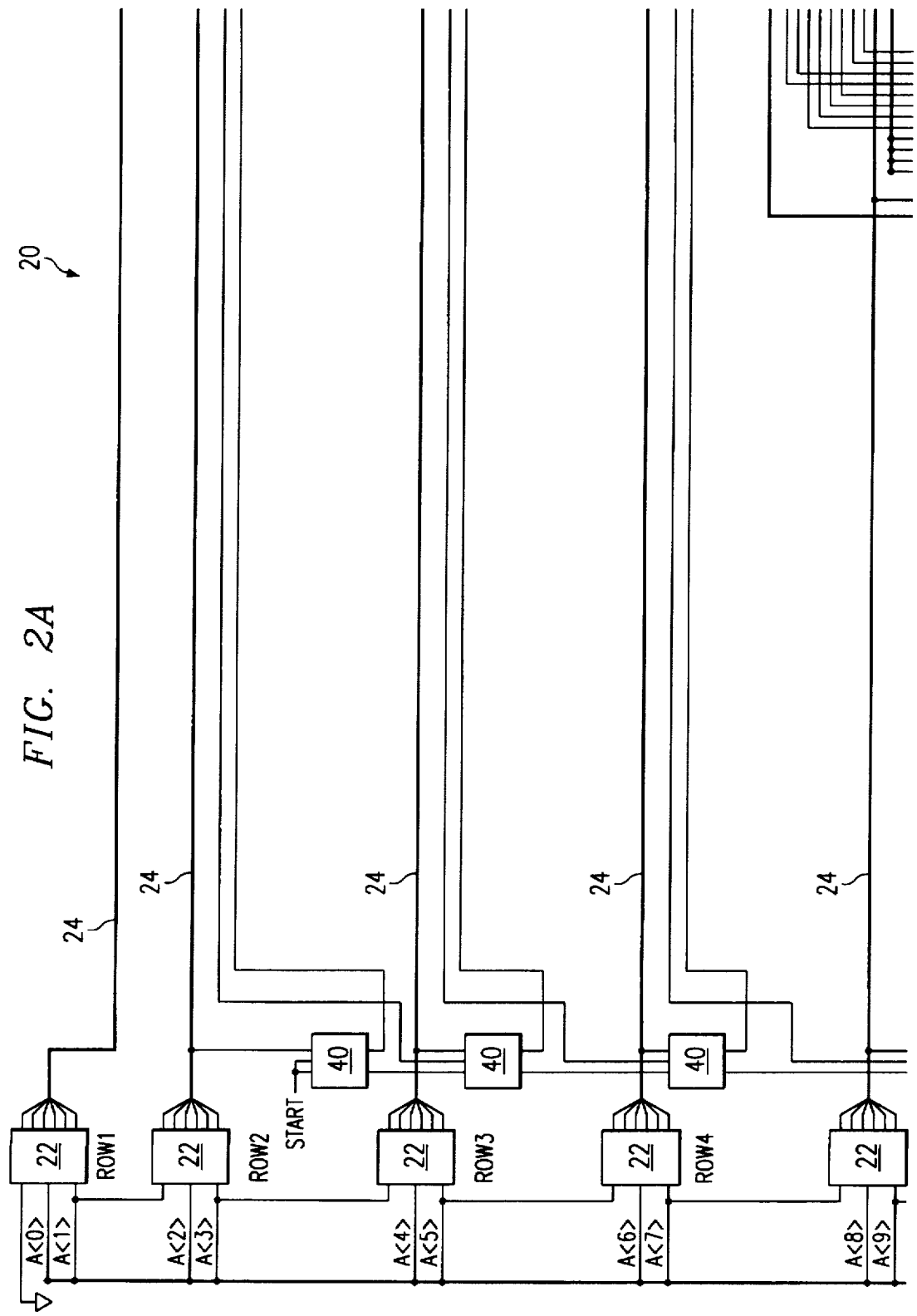

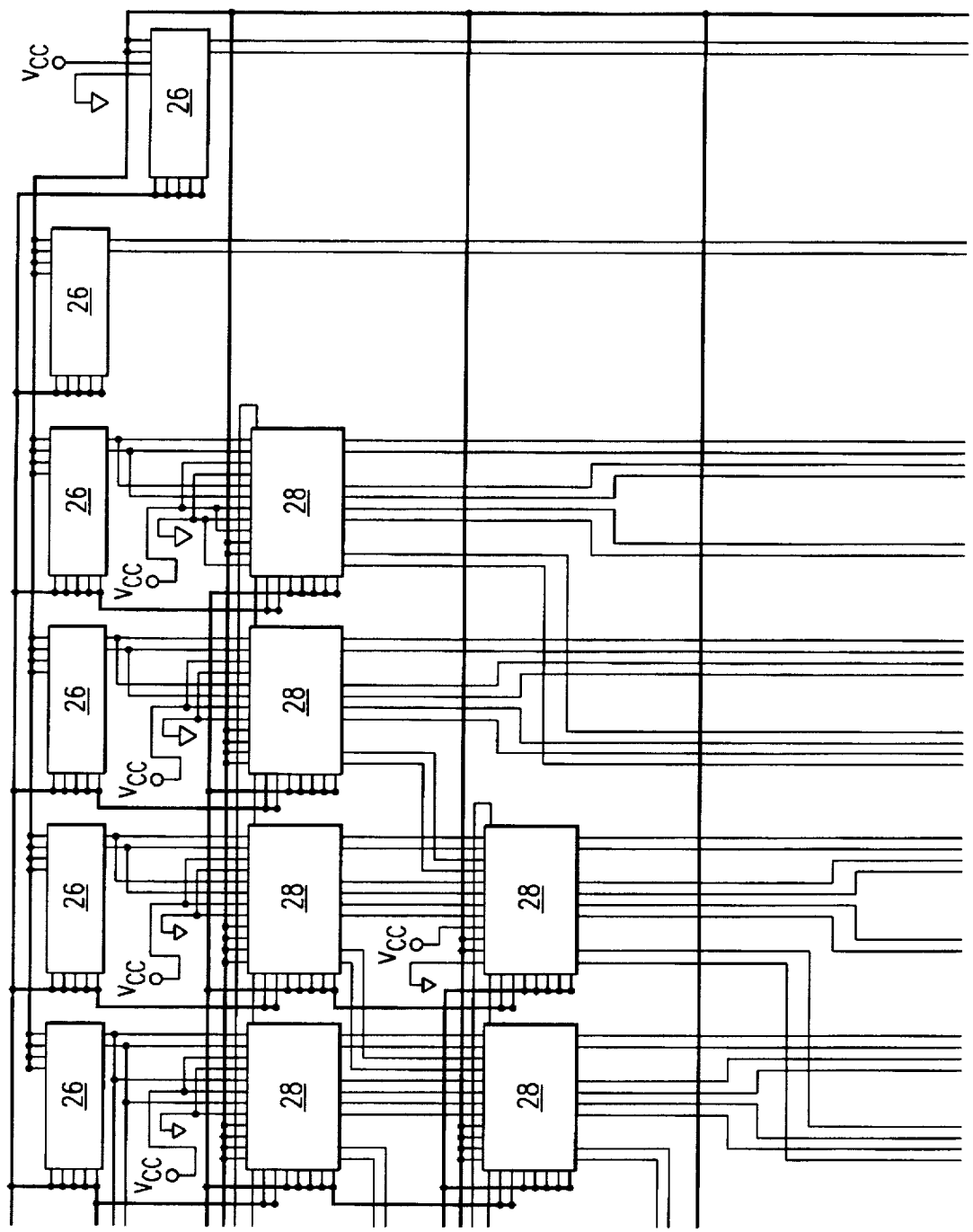

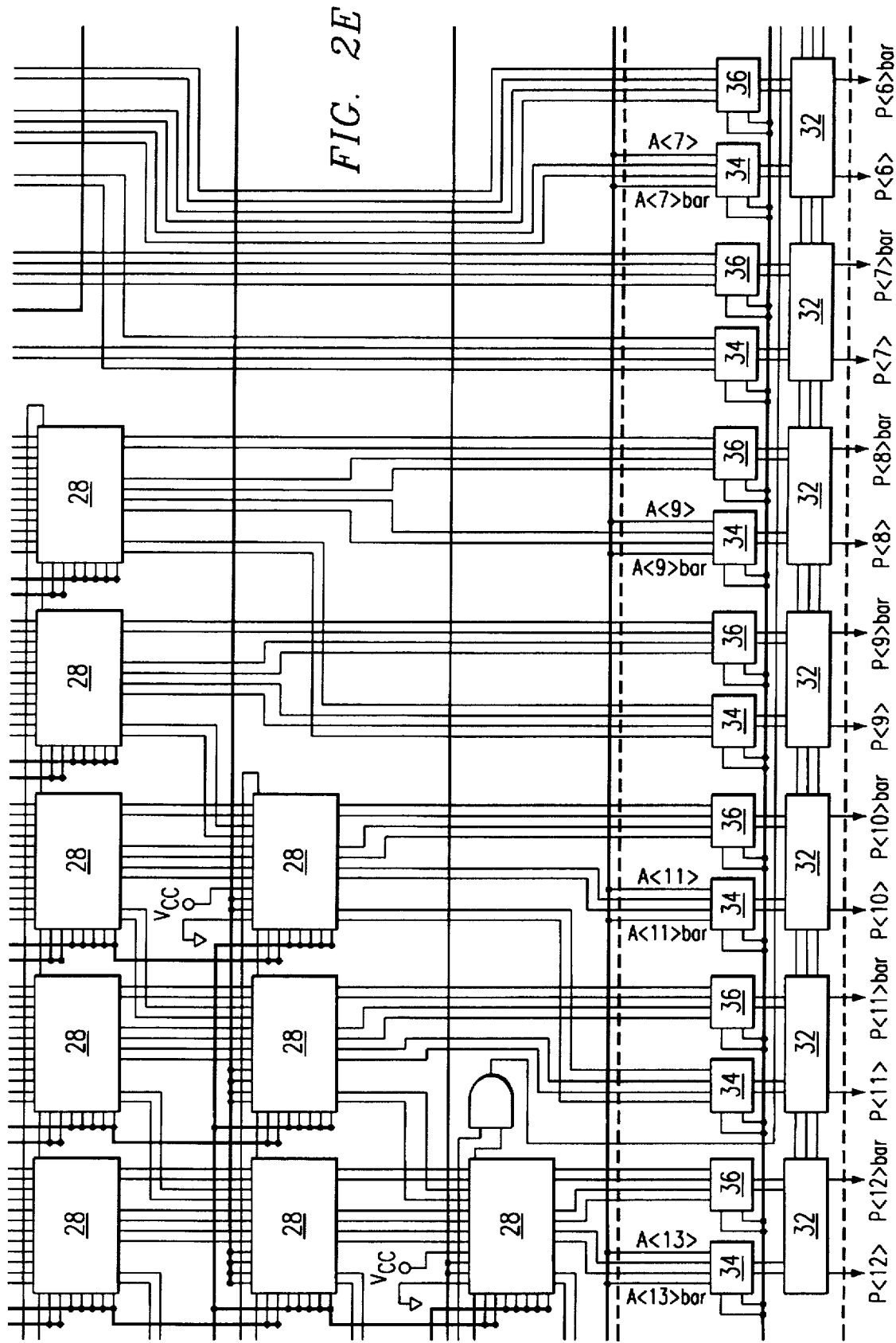

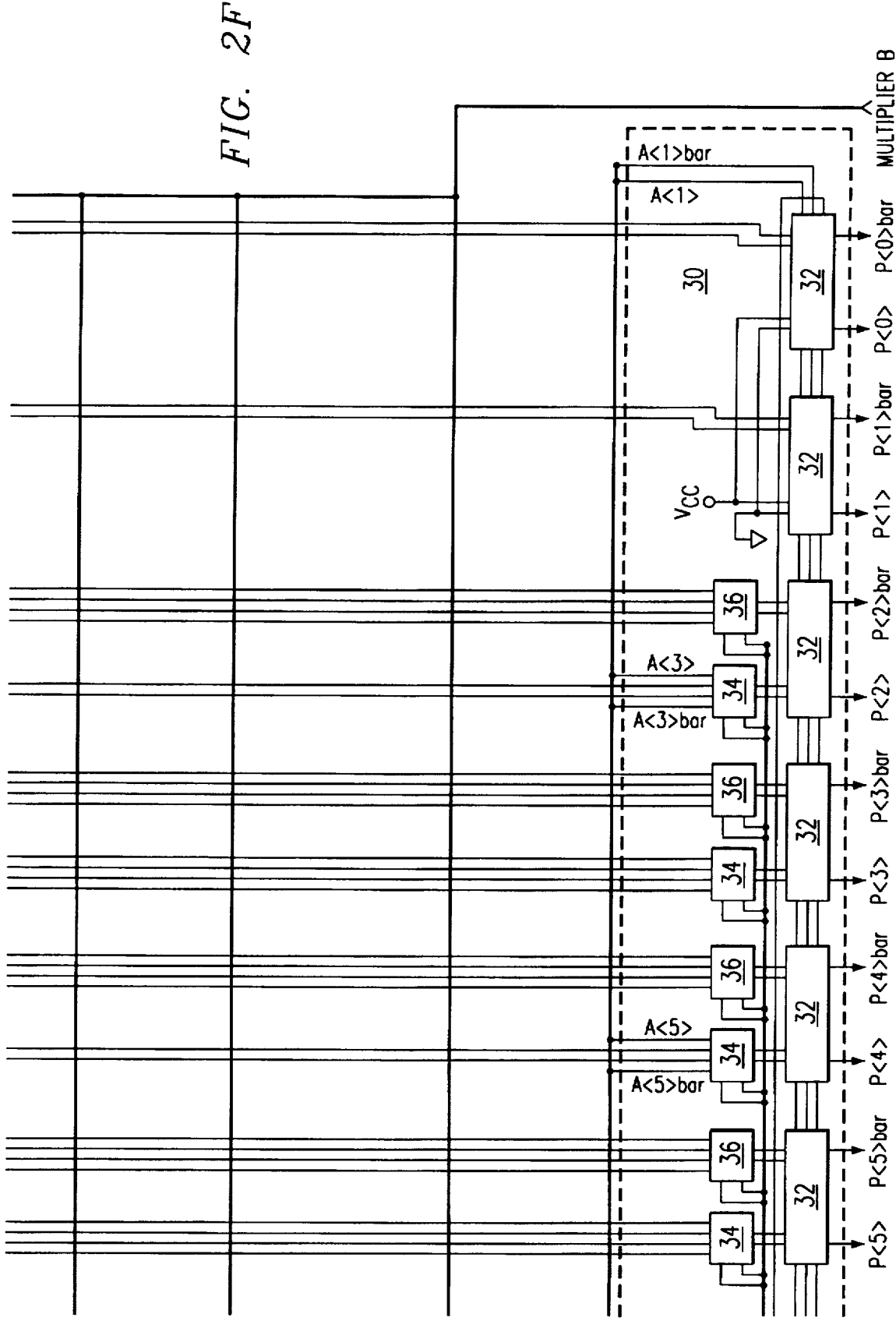

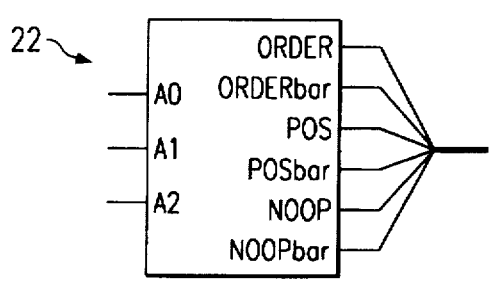
FIG. 2G
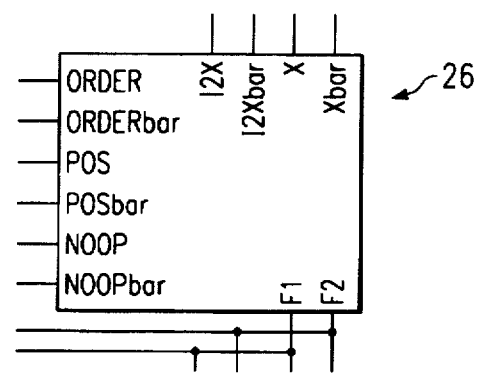
FIG. 2H
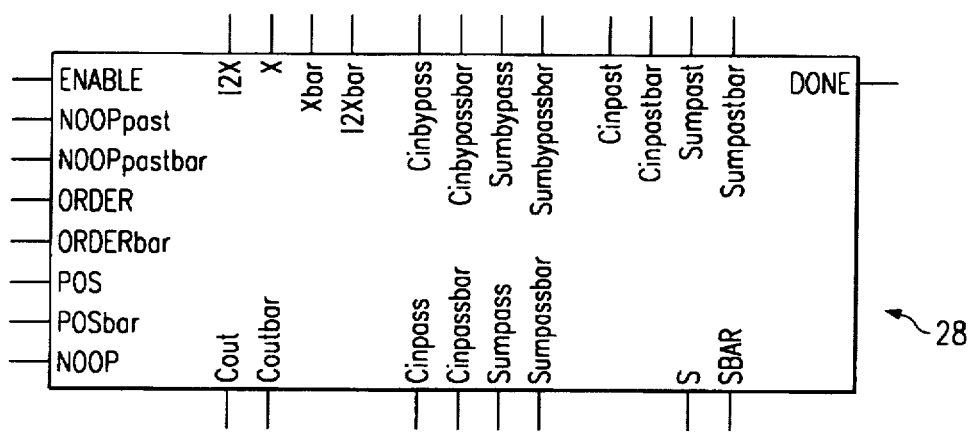
FIG. 2I
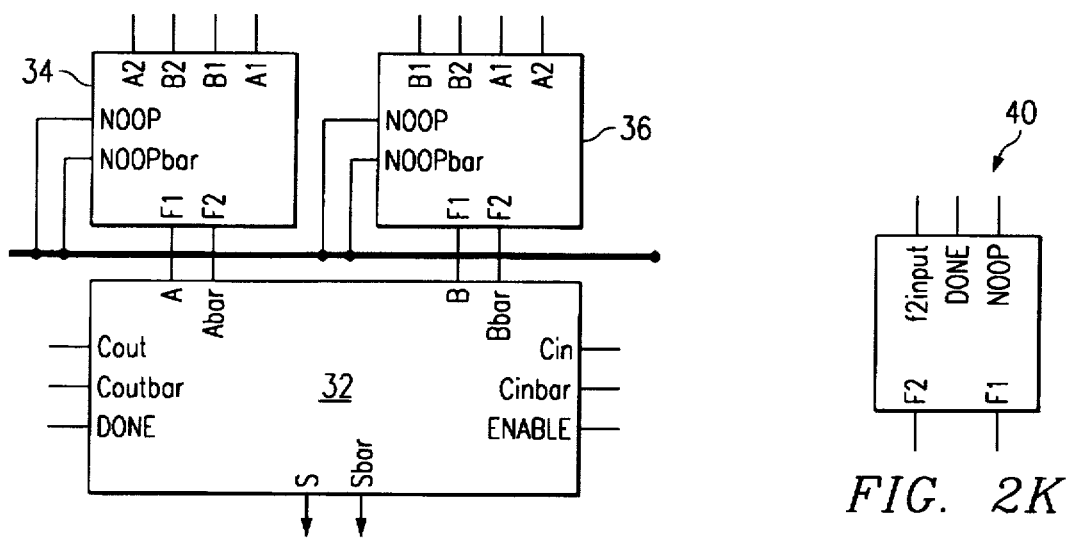
FIG. 2J
FIG. 2K

ULTRA LOW POWER MULTIPLIER

This is a continuation of application Ser. No. 08/356,054, filed on Dec. 14, 1994, now abandoned.

TECHNICAL FIELD OF THE INVENTION

The present invention pertains to digital multipliers, and, more particularly, to ultra low power multipliers.

BACKGROUND OF THE INVENTION

With the development of submicron technologies and the increase of complexity on VLSI chips the market for portable applications, digital signal processors and ASIC implementations has focused significant effort on the design of low power systems.

Multipliers are an important part of complex systems (i.e., digital filters, digital signal processors, floating point processors, etc.) and a significant amount of power is dissipated in the multiplier. One application for low power multipliers is for seismic digital signal processor (DSP) systems for gathering of seismic data at multiple remote locations.

It can therefore be appreciated that an ultra low power multiplier is highly desirable.

SUMMARY OF THE INVENTION

It is, therefore, an object of this invention to provide a digital multiplier which is relatively low in power dissipation compared to prior art multipliers.

It is also an object of this invention to provide a multiplier in which the power dissipated is a function of the input data.

It is a further object of this invention to provide a multiplier in which spurious transitions and logic races are avoided.

It is still another object of this invention to provide a multiplier in which timed clock signals are avoided thereby saving chip area used in prior art multipliers to generate these timed clock signals.

It is a further object of this invention to provide a multiplier which uses a relatively uncommon logic family to reduce the overall capacitance per logic block as compared to standard CMOS logic.

Shown in an illustrated embodiment of the invention is a digital multiplier in which the power dissipated in each multiplication operation is a function of the input data.

Also shown in an illustrated embodiment of the invention is a digital multiplier in which the multiplication operation involves calculations which begin in a top row and progress to a bottom row, and wherein, depending on the input data, some row calculations are suppressed.

Further shown in an illustrated embodiment of the invention is a digital multiplier in which the various blocks of computational logic operate in an iterative manner such that each block provides a data valid signal to enable the next sequential block of the computational flow.

BRIEF DESCRIPTION OF THE DRAWINGS

The aforementioned and other features, characteristics, advantages, and the invention in general will be better understood from the following more detailed description taken in conjunction with the accompanying drawings, in which:

FIGS. 2A–2F is a detailed block diagram of a multiplier according to the present invention;

FIGS. 2G–2M are enlarged block diagrams of the major block diagrams shown in FIGS. 2A–2F;

Figures 1, 2:
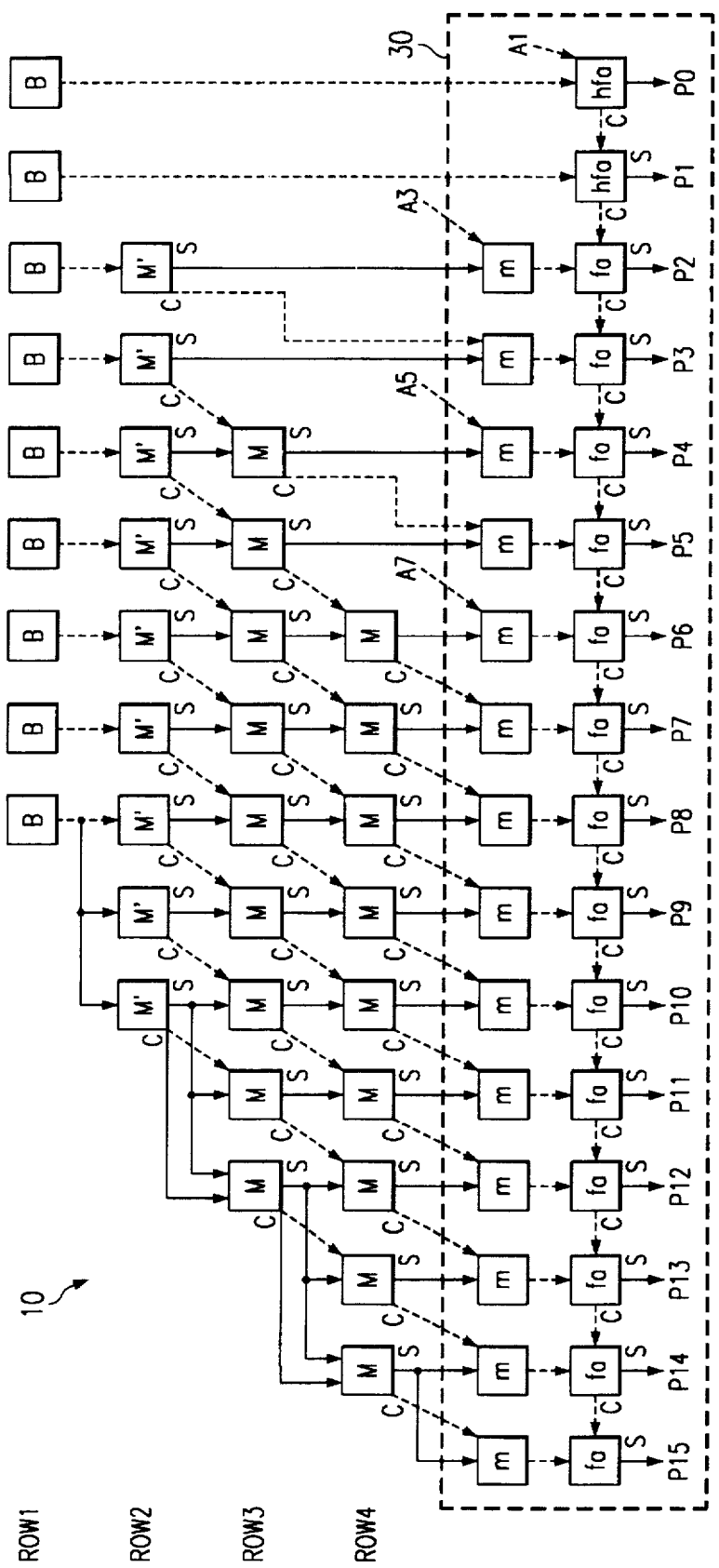
FIG. 1 is a block diagram of a multiplier according to the present invention.
FIG. 2 shows the proper arrangement of FIGS. 2A–2F.

It will be appreciated that for purposes of clarity and where deemed appropriate, reference numerals have been repeated in the figures to indicate corresponding features.

DETAILED DESCRIPTION

A multiplier according to the preferred embodiment of the present invention uses a multiplier method originally developed by A. D. Booth ("A Signed Binary Multiplication Technique," *Quart. J. Mech. Appl. Math*, vol. 4, pt. 2, pp. 236–240, 1951) and modified by O. L. MacSorley ("High-Speed Arithmetic in Binary Computers," *IRE Proc.*, vol 49, pp. 67–91, Jan. 1961), and hereinafter referred to as the modified Booth algorithm. The multiplication of two numbers using the modified Booth algorithm is as follows: Given two numbers A and B, the multiplicand A (taking three bits at a time) is analyzed to determine whether to add zero, 1, −1, 2, or −2 times B to the accumulated partial product as shown in the following table.

TABLE 1

| Modified Booth Algorithm | | | |
|---|---|---|---|
| $A_{i+1}$ | $A_i$ | $A_{i-1}$ | Operation |
| 0 | 0 | 0 | P = Pa/4 (NOOP) |
| 0 | 0 | 1 | P = (Pa + B)/4 |
| 0 | 1 | 0 | P = (Pa + B)/4 |
| 0 | 1 | 1 | P = (Pa + 2B)/4 |
| 1 | 0 | 0 | P = (Pa − 2B)/4 |
| 1 | 0 | 1 | P = (Pa − B)/4 |
| 1 | 1 | 0 | P = (Pa − B)/4 |
| 1 | 1 | 1 | P = Pa/4 (NOOP) | where Pa represents the partial product accumulated up to the present iteration, and P is the partial product after the present iteration. By way of example consider the case where A=17 and B=5. The multiplicand A is first divided into groups of three bits with a one bit overlap, with a zero added to the right of the least significant bit, and the sign bit extended to make a full group of three:

| 0 | 1 | 0 | 0 | 0 | 1 | 0 |

There are three triplets: 010, 000, and 010. From the table above, it can be seen that 000 is Pa/4 and 010 is (Pa+B)/4. Adding each of the products, P, and shifting to the left by two digits to divide by 4, the calculation is

```
   0101
   0000
   0101
 ‾‾‾‾‾‾‾‾
 01010101 = 85
```

FIG. 1 is a block of an eight bit by eight bit multiplier 10 according to the present invention. The top row, ROW1, is made up of nine Booth encoders/multiplexers, B. The next row, ROW2, is made up of nine multiplier cells with half adders, M'. The next two rows, ROW3 and ROW4, are comprised of nine multiplier cells, M. A carry propagate adder, 30, includes 14 8-4 multiplexers, m, 14 ECDL full adders, fa, and two ECDL half adders, hfa. In FIG. 1 a dashed line with an arrow indicates a single signal (or two complementary signals), a thin solid line with an arrow indicates two separate signals, and a thick solid line indicates three separate signals. Each of the multipliers M and M', and each of the adders fa and hfa provide a sum output S and a carry output C. The outputs of the adders fa and hfa provide the product bits (P0 through P15) of the multiplier 10. Bits A1, A3, A5, and A7 of the multiplicand are used to correct for two's complement on each row as will be explained in more detail below. For simplicity the term −2, −1, 1 or 2 times the operand is not shown in the figure.

Table 1 shows that the implementation of the modified Booth algorithm with multiplicand A numbers which have a random distribution will have a 25% probability of being a NOOP (i.e., 000 or 111). The conventional implementation of the algorithm adds a zero in this case. Assume the encoding for row i is 001. This means that B will be added to the accumulated partial products from the past row. Then assume that row i+1 has 000 or 111. In this case an encoder translates a 000 or 111 condition to a NOOP (i.e., a zero is added in this row). If the multiplicand is a small number, it will mean that zeros are being added in those rows. For example if the multiplicand A is seismic data which has decaying impulses, but is otherwise close to zero the rest of the time, then a large number of rows will be adding zeros. The fact that a zero is added means that all the rows of adders need to be turned on to add a zero. In the present invention these NOOP rows are bypassed rather than turning on the whole array to add these zeros as shown in FIG. 2.

FIGS. 2A–2F is a block diagram of a 14 bit by 5 bit digital multiplier 20 according to the present invention. FIG. 2 shows how the FIGS. 2A–2F fit together. Although the preferred embodiment is a 24 bit by 24 bit multiplier, the smaller multiplier of FIGS. 2A–2F is shown for simplicity. It will be appreciated by those skilled in the art that circuit shown in FIGS. 2A–2F can be directly scaled up to provide a 24 bit by 24 bit multiplier. FIGS. 2G–2M are enlarged blocks of the major blocks of FIGS. 2A–2F. FIGS. 2G–2K show the respective input and output signals for each block. FIGS. 2L–2M show the connections to the Multiplier B bus to the Booth decoders/multiplexers 26 and the multicell circuits 28.

Along the left hand side of the circuit diagram is shown the multiplicand A bus. Since A is 14 bits in length, it is divided into the following seven triplets:

| A13 | A12 | A11 | A10 | A9 | A8 | A7 | A6 | A5 | A4 | A3 | A2 | A1 | A0 | 0 |

Each of these triplets are Booth encoded in the seven Booth encoders 22, one associated with each of the seven rows, ROW1 through ROW7. Each of the Booth encoders 22 provides three sets of true signals (ORDER, POS, and NOOP), and their complementary signals (ORDERbar, POSbar, and NOOPbar). The ORDER signal indicates if the operation is 1 times or 2 times the multiplier B. The POS signal indicates if the operation uses +XB or −XB. The NOOP signal indicates if a NOOP condition is present. These signals are carried on buses 24 to the Booth decoders/multiplexers 26 in the first row, and to the multicell circuits 28 in rows 2 through 7.

In the Booth decoders/multiplexers 26 the appropriate signal 1XB, 1XBbar, 2XB, or 2XBbar is selected and it and its inverse are placed on the outputs F1 and F2. It will be understood by those skilled in the art that 1XBbar and 2XBbar are the bit complements of 1XB and 2XB, and not the two's complement of 1XB and 2XB. The two least significant bits of the six Booth decoders/multiplexers 26 are passed to the carry propagate adder 30 which consists of 19 full adders, 32, 17 of which have two multiplexers, 34 and 36, associated with the full adders 32. The two least significant bits of the carry propagate adder 30 don't have multiplexers associated with the full adders 32. These two least significant bits receive the F1 and F2 outputs of the two least significant bits of the six Booth decoders/multiplexers 26.

The F1 and F2 outputs of the other four Booth decoders/multiplexers 26 are passed, respectively, to the four least significant multicell circuits 28 in the second row, ROW2. The sum (S, Sbar) outputs of the two least significant bit multicell circuits 28 of ROW2 are passed to the carry propagate adder 30, and the carry output (Cout, Coutbar) of the least significant multicell circuit 28 is also passed to the carry propagate adder 30. The S, Sbar, Cout, Coutbar, Cinpass, Cinpassbar, and Sumpass, Sumpassbar outputs are passed to the next row, ROW3, from ROW2. All of these signals go directly to the multicell circuit 28 below the current multicell circuit 28 except for the Cout and Coutbar signals which are passed to the next most significant bit in the row below. The two most significant bits in ROW2 don't have a Booth decoders/multiplexers 26 directly above them, and they tap off the same input signals as the third most significant bit thereby extending the sign of the bits in the row above.

The operation of ROW2 is repeated in ROW3 through ROW7, except that the all of the S, Sbar, Cout, Coutbar outputs of the bottom row, ROW7, are connected to the carry propagate adder 30.

Figure 2B:
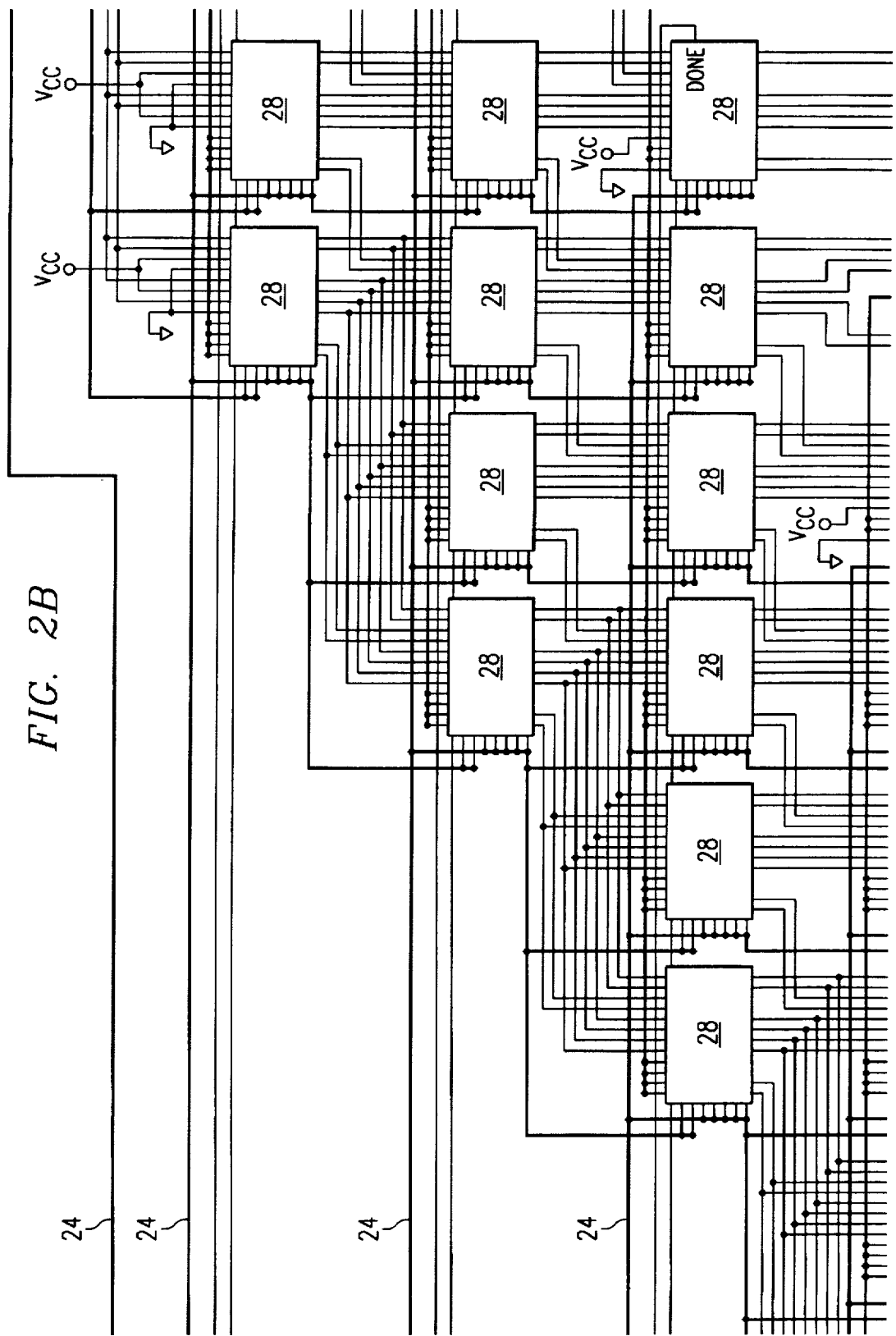
Figure 2D:
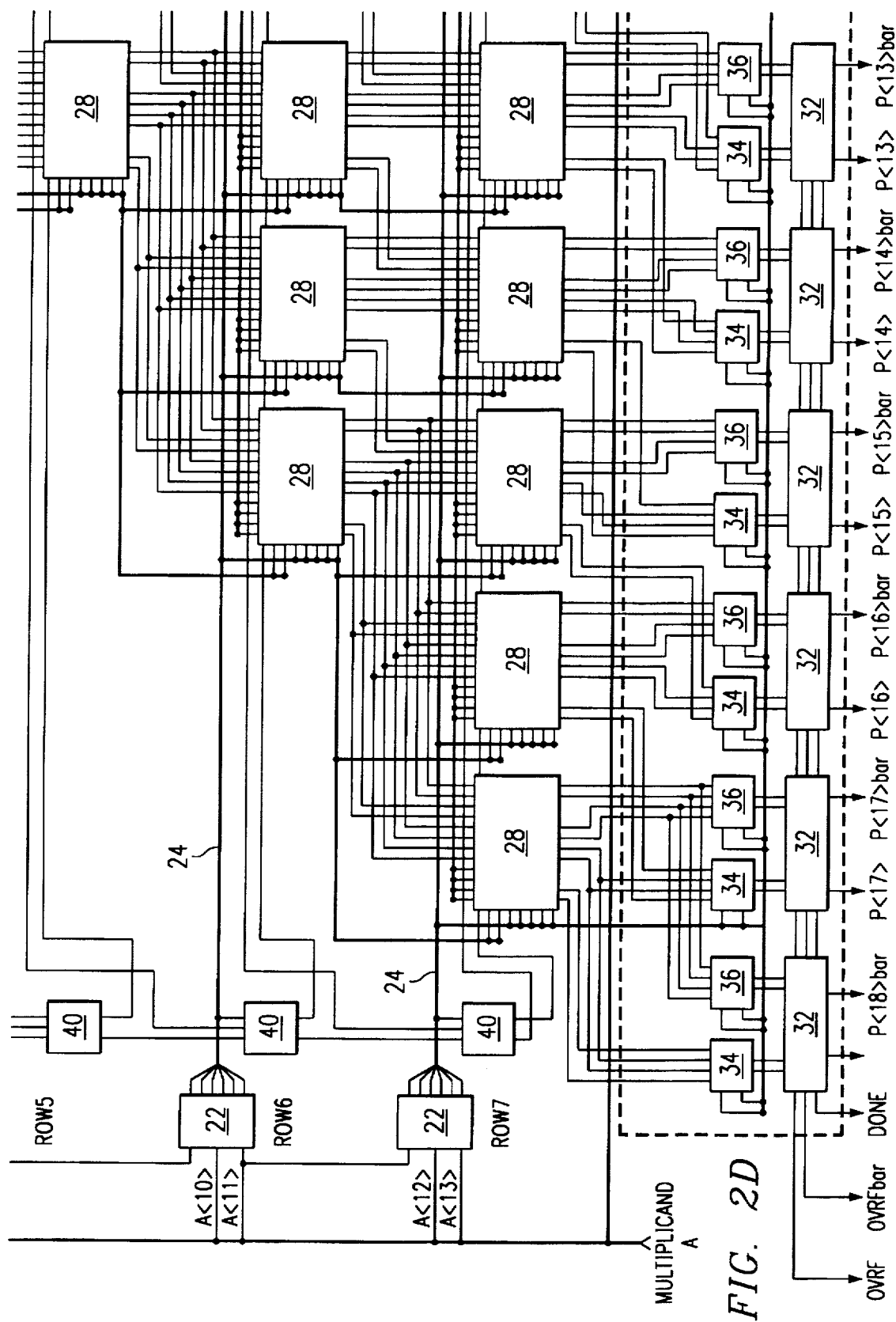
Figure 2L:
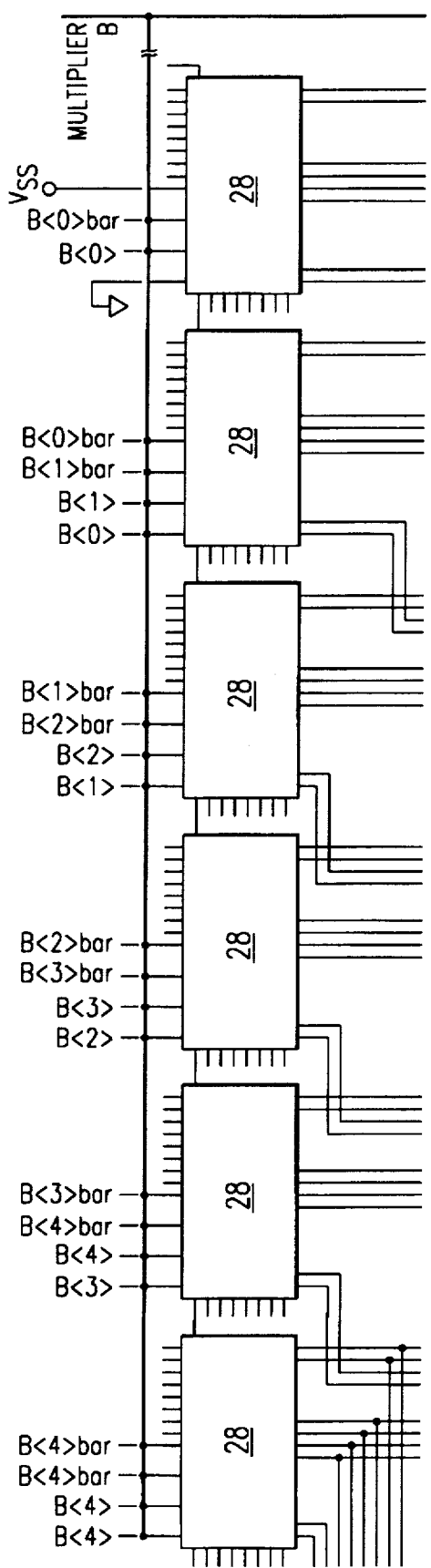
Figure 2M:
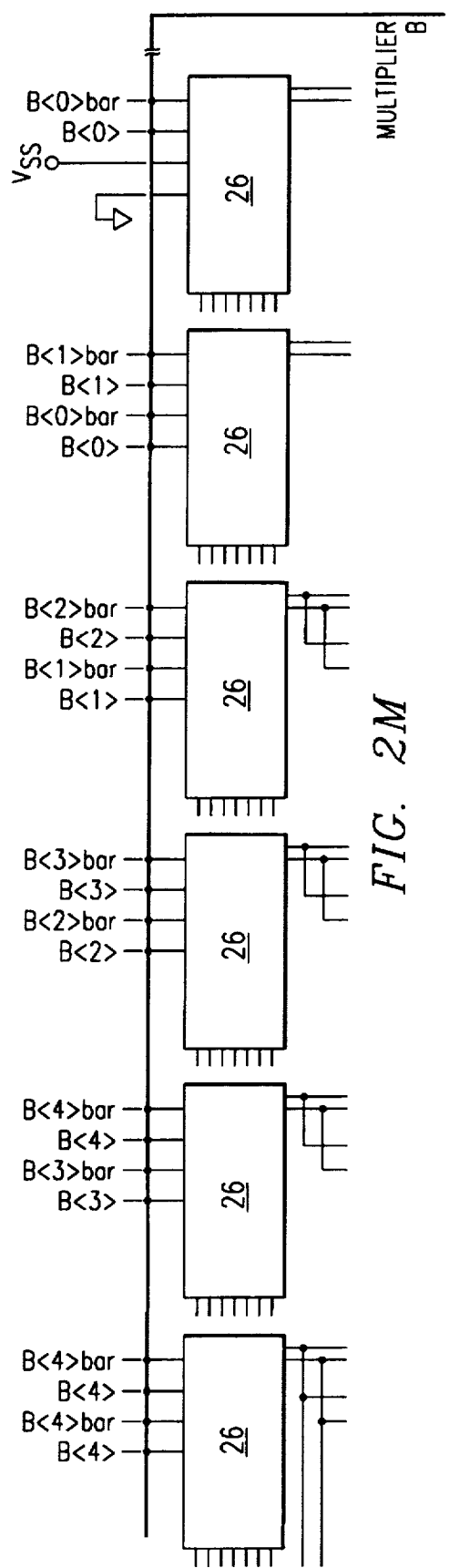

On the left side of FIGS. 2A and 2D are six switches, 40, one for each of the rows ROW2 through ROW7. These switches 40 receive an input signal, either START in the case of the top switch, or DONE in the case of the other five switches, and may enable their respective rows of multicell circuits 28 by sending out an enable signal to the ENABLE input of one of the two multicell circuits 28 on one end or the other of each row (which end is unimportant). Upon receipt of an enable signal (which is normally high and is active low) at its ENABLE input, each of the multicells activates its adder and then generates a done signal at the DONE output which in turn activates the next adder, or then signals to the switch 40 in the next row that the present row is finished, or passes an enable signal through an AND gate 42 (FIG. 2E) which is passed to the carry propagate adder 30 so that the carry propagate adder 30 can make the final calculations.

Each of the switches 40 is controlled by the NOOP signal on its associated bus 24. If the Booth encoded triplet is other than 000 or 111, then the switch 40 signals its respective row to begin the addition process for that row. Note that ROW1 is composed of static multiplexers which are always on. However once these multiplexers have reached their initial state, they do not change, and therefore consume essentially no power from then on. In the adders, however, each time data ripples through the adder strings, power proportional to $C_{total} F_P Vss^2$ is dissipated in each gate, where $C_{total}$ is the capacitance driven by the gate, $F_P$ is the frequency of operation, and Vss is the power supply voltage.

In the operation of the preferred embodiment, for each multiplication, with the digital multiplier 20 initially in the reset state (i.e., START and ENABLE signals high), the input multiplicand and multiplier are selected. When the multiplication operation starts (START goes low), the digital multiplier 20 runs through one cycle and the adders make one transition. After this initial operation is done, the START is brought high which, in turn, causes the ENABLE lines to go high, and the multiplier 20 is ready for new multiplicand and multiplier data. Therefore an important power saving feature of the present invention is that the adders operate at most only twice for each multiplication operation.

If the Booth encoded triplet is 000 or 111, then the enable signal to that row is suppressed by the switch 40, and an enable signal is passed to the next switch 40 or to the AND gate 42 in the case of the last switch 40. When the enable signal is suppressed, the respective row does not calculate its sums and carrys. Since this data is not available to the next row, each of the multicell circuits 28 also passes the sums and carrys from the prior row and make it available to the next row. Thus each of the multicell circuits 28 need to know if the prior row was a NOOP or a normal operation. This is accomplished with the NOOPpast and NOOPpastbar signals.

This row suppression, that depends on the input data which may vary, is different than row elimination in some prior art multipliers in which one of the multiplicand or multiplier is constant, and a row can be eliminated when the constant data is encoded to make the coefficients for a whole row all zeros. See, for example, Jullien, "High Performance Arithmetic for DSP Systems," *VLSI Signal Processing Technology*, Kluwer, Boston, 1994, Chapter 3.

The multiplicand A bus running through the carry propagate adder 30 provides the proper sign of carry bit for the adders 32. As shown in Table 1, when the most significant bit of each triplet is a "1," then the two's complement of the B data is to be used. Since the Booth decoders/multiplexers 26 and the multicell circuits 28 have only the bit complement of the B data available (which avoids the power and circuitry required to generate the two's complement of the B data), the odd bits of the A data are added as carries to the carry propagate adder 30 to correct the data.

Figure 3:
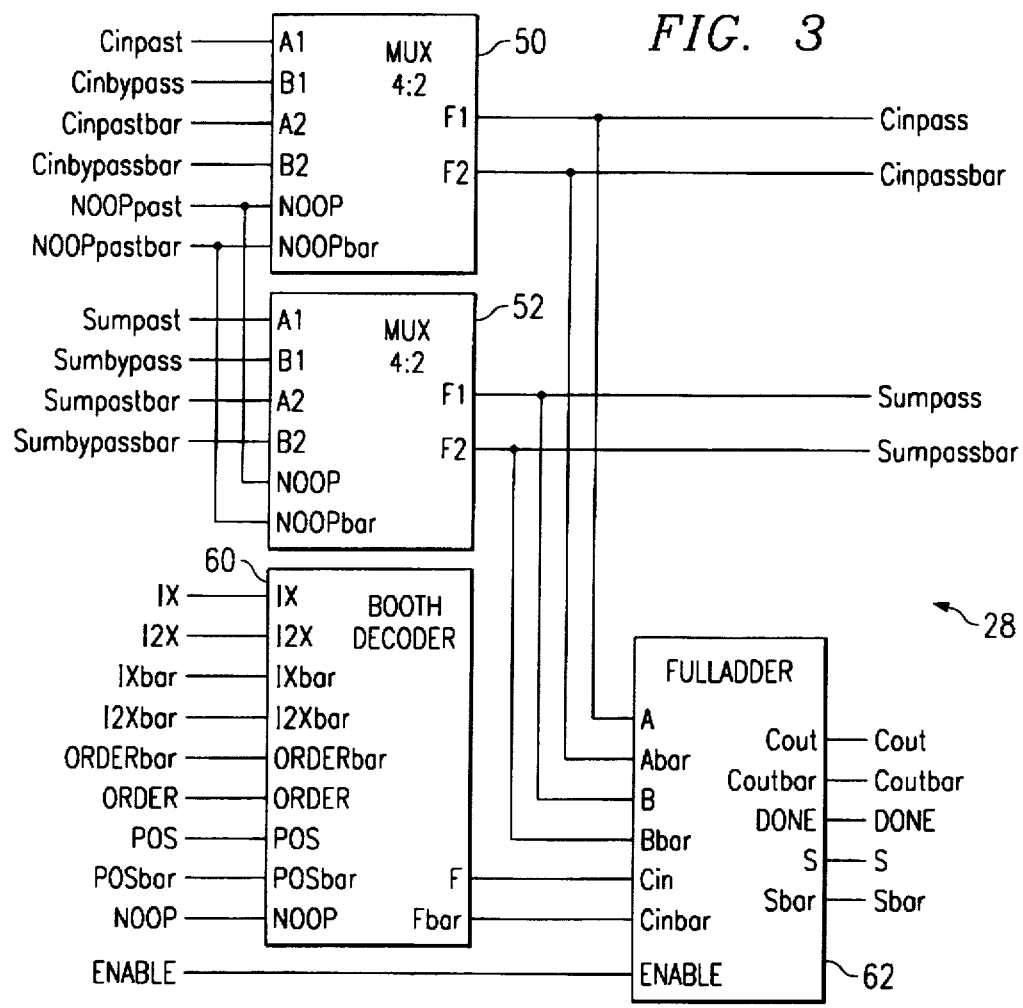
FIG. 3 is block diagram of a multicell used in FIGS. 2A–2F.

FIG. 3 is a block diagram of a multicell circuit 28. As shown in FIG. 3 each of the multicell circuits 28 includes two 4 to 2, or 4:2, multiplexers 50 and 52. Multiplexer 50 selects which of Cinpass (also Cinpassbar) and Cinbypass (also Cinbypassbar) to place on the Cinpass (Cinpassbar) outputs. This selection is controlled by NOOPpast (and NOOPpastbar). Similarly multiplexer 52 selects which of either Sumpast (Sumpastbar) or Sumbypass (Sumbypassbar) is selected by NOOPpast (NOOPpastbar) and placed on the Sumpass (Sumpassbar) outputs. When the previous row operated normally, (i.e., not a NOOP condition), then the sum (Sumpast, Sumpastbar) and carry (Cinpast, Cinpastbar) from the previous row is placed on the Sumpass, Sumpassbar, Cinpass, and Cinpassbar outputs. Conversely, when the previous row was in a NOOP condition, then the sum and carry from two rows back (or three rows back or four rows back, etc., depending on the NOOP status of these rows) as input signals Sumbypass, Sumbypassbar, Cinbypass, Cinbypassbar, are passed to the output signals Sumpass, Sumpassbar, Cinpass, and Cinpassbar.

Figure 4:
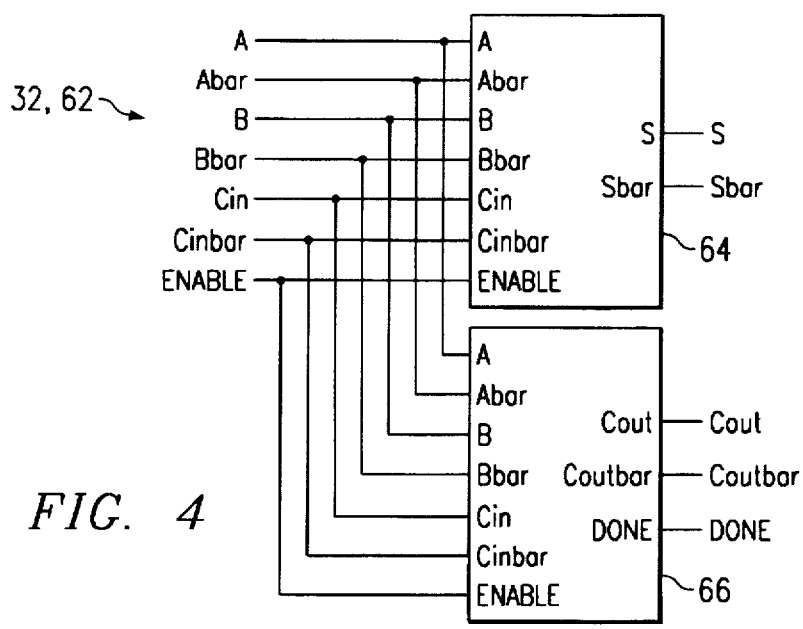
FIG. 4 is a block diagram of a full adder shown in FIG. 3.

Also shown in FIG. 3 is a Booth decoder, 60, which is also used in the Booth decoders/multiplexers 26, and a full adder, 62. A block diagram of the full adder 62 is shown in FIG. 4 which consists of a sum block, 64, and a carry block 66.

Figure 5:
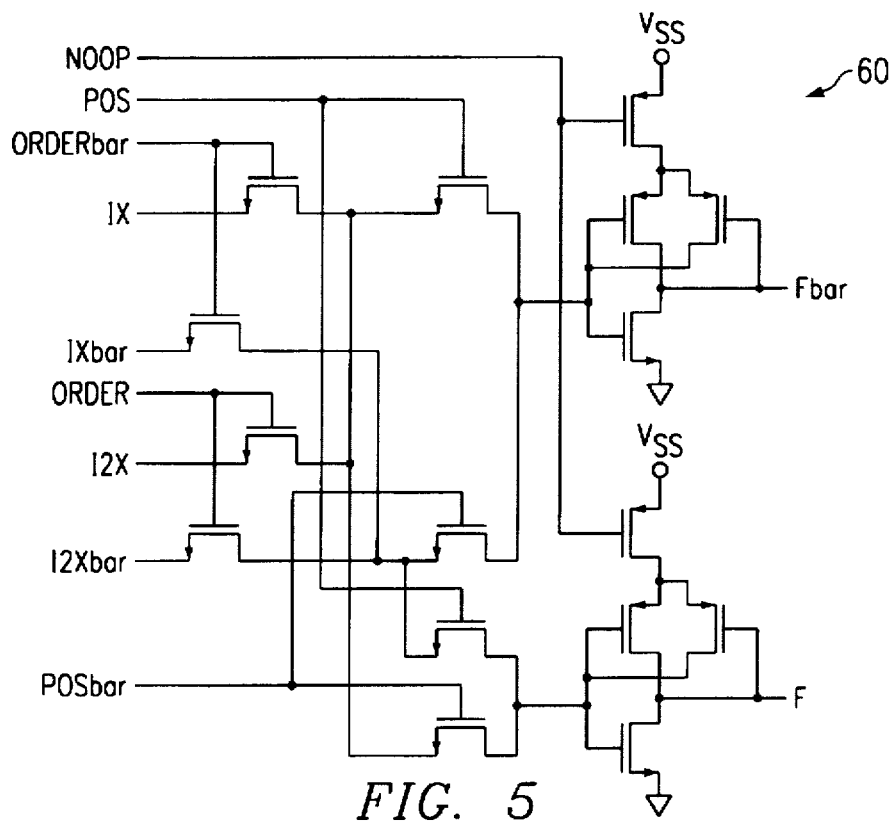
FIG. 5 is a circuit diagram of a Booth encoder shown in FIG. 3.

The circuit diagram for the Booth decoder 60 is shown in FIG. 5, and uses the Normal Pass Transistor Logic (NPCL) family to select the appropriate signal to be passed to the outputs.

Figure 6:
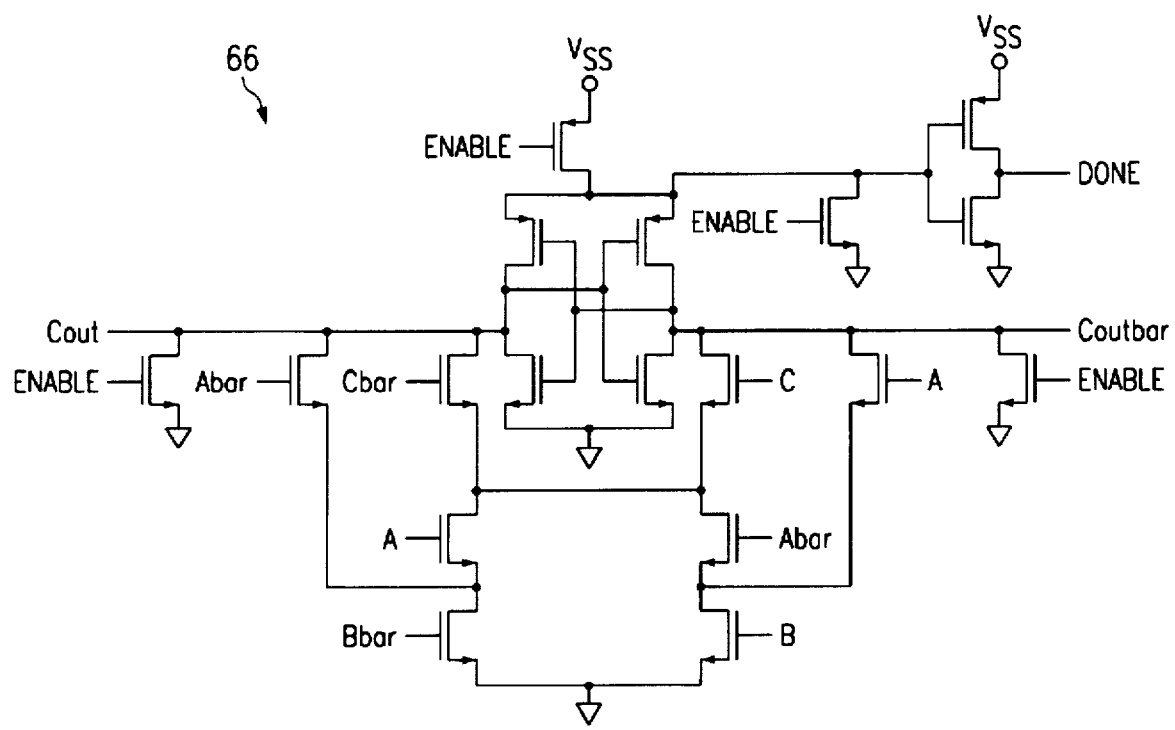
FIG. 6 is a circuit diagram of a carry block shown in FIG. 4.
Figure 7:
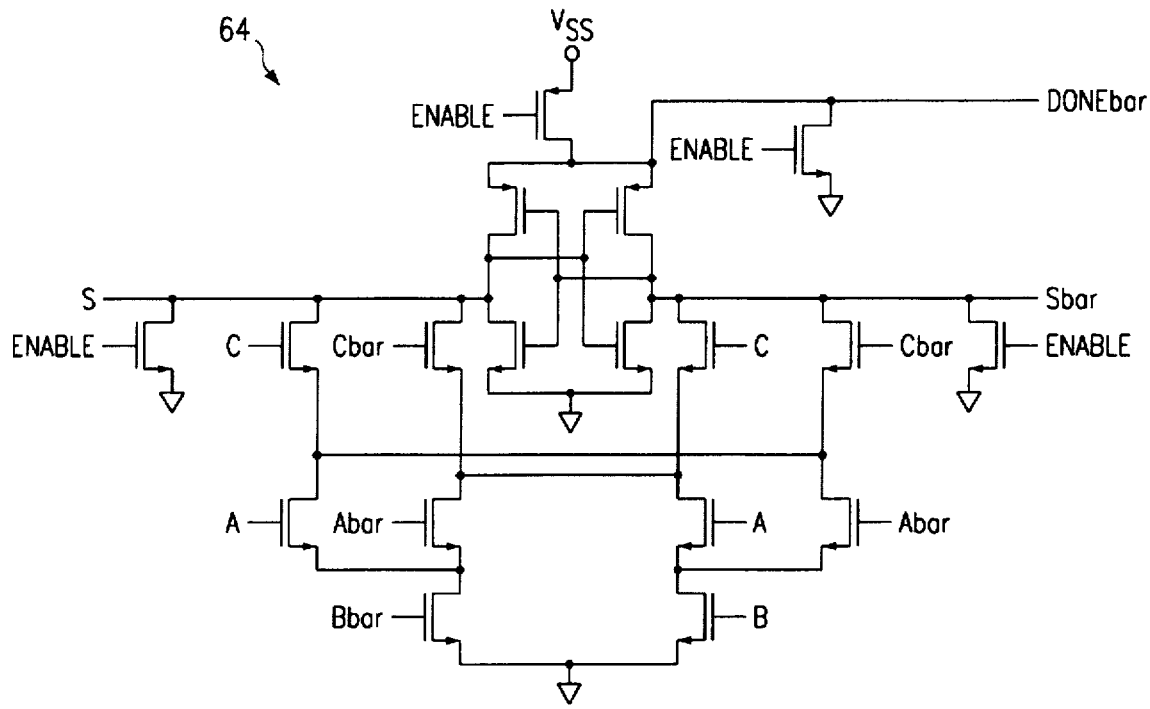
FIG. 7 is a circuit diagram of a sum block shown in FIG. 4.

The circuit diagram for the carry block 66 is shown in FIG. 6, and the circuit diagram for the sum block 64 is shown in FIG. 7. Both of these circuits use the Enable/Disable CMOS Differential Logic (ECDL) family, which is described by Shih-Lien Lu in "Implementation of Iterative Networks with CMOS Differential Logic," *IEEE Journal of Solid-State Circuits*, vol. 23, pp. 1013–1017, 1988. In this circuitry every block requires the implementation of the functions and its complement on two NMOS trees. One PMOS transistor enables the whole gate to Vss while two NMOS transistors help to turn off the whole block quickly. This family is completely static and provides a done signal which can be used to enable the next block. A couple of cross-coupled inverters are used to achieve the right logic values using regeneration every time the block is enabled. Although this family has twice as many inputs as a standard CMOS implementation, the input capacitance is less than standard CMOS since the ECDL family has only NMOS transistor inputs and thereby eliminates the PMOS transistor inputs of standard CMOS which typically have about twice the input capacitance of NMOS transistors.

Figure 8:
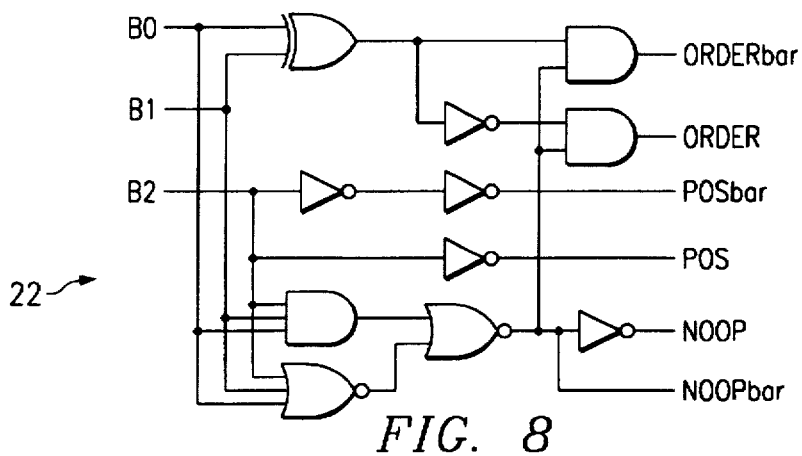
FIG. 8 is a logic diagram of the Booth encoders shown in FIGS. 2A and 2D.
Figure 9:
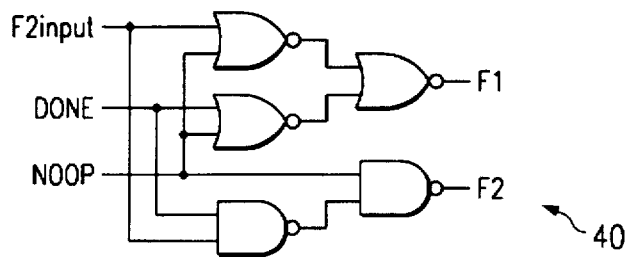
FIG. 9 is a logic diagram of the switches shown in FIGS. 2A and 2D.
Figure 10:
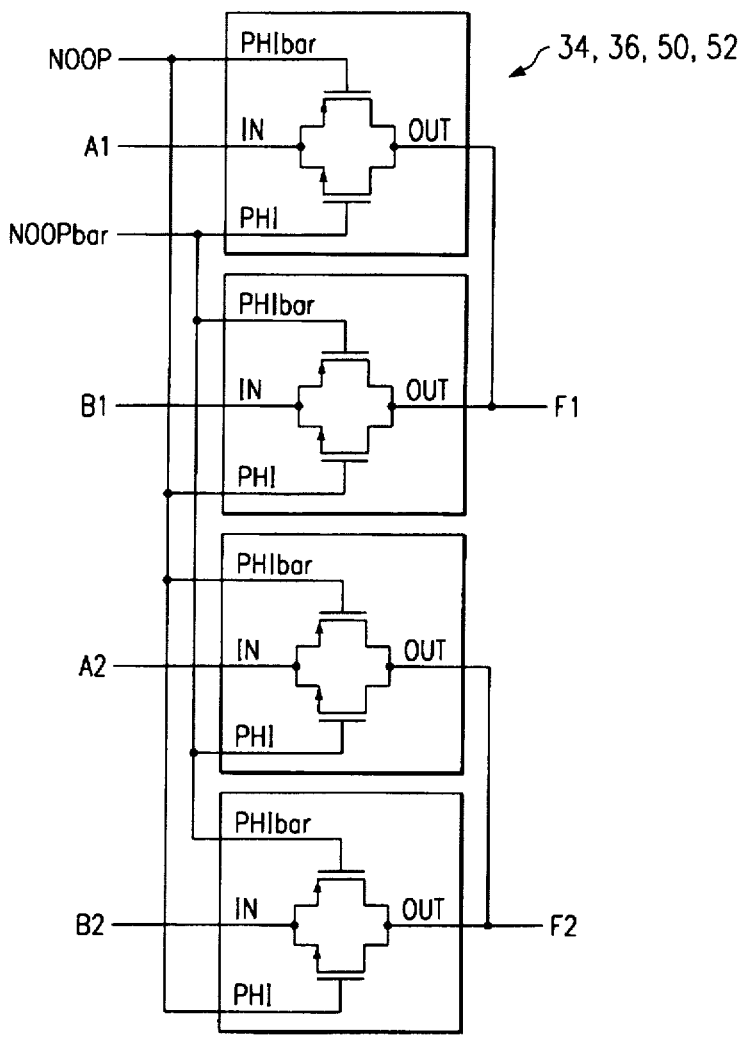
FIG. 10 is a circuit diagram of the multiplexer shown in FIGS. 2D, 2E, 2F, and 3.
Figure 11:
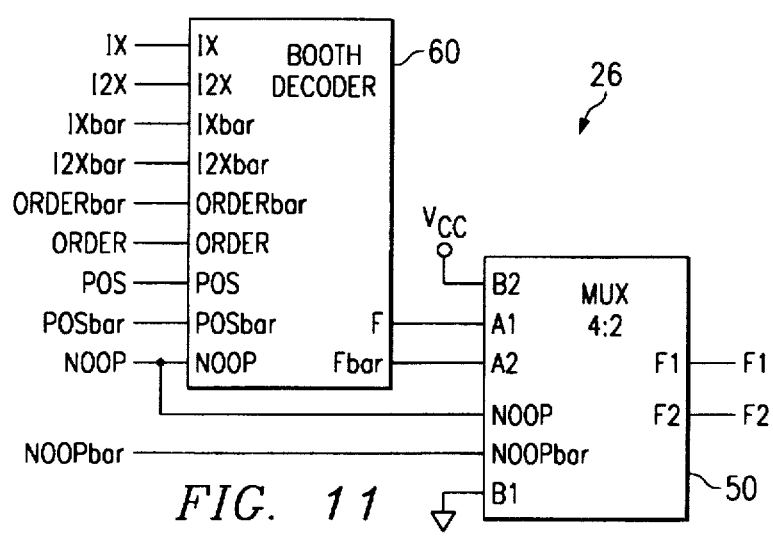
FIG. 11 is a block diagram of a Booth decoder/multiplexer shown in FIG. 2C.

FIG. 8 is a logic diagram of the Booth encoders 22 shown in FIGS. 2A and 2D, and FIG. 9 is a logic diagram of the switches 40 shown in FIGS. 2A and 2D. FIG. 10 is a circuit diagram of the multiplexers 34, 36, 50, and 52, and FIG. 11 is a block diagram of a Booth decoder/multiplexer 26.

During a multiplication cycle of the digital multiplier 20, when the START signal is first brought high to preset all of the multicell circuits 28 and the adders 32 to a preset state, then the input data is changed, and the START signal is brought low to perform the multiplication, if a row is bypassed, the multicell circuits 28 of that row are left in their preset state and therefore dissipate much less power than the rows on multicell circuits 28 which become active. Further, if a row of multicell circuits 28 remains in the preset state for two multiplication operations in a row (i.e., two noop operations in a row), then the NOOP inputs to the multiplexers 34 and 36 do not change between cycles providing a further power savings. Also the NOOP inputs to the multiplexers 34 and 36 do not change when the same row performs two active operations in a row.

It will be understood by those skilled in the art that the actual layout of the multicells will be rectangular rather than the diamond shape shown in FIG. 2A–2F. The 24 bit by 24 bit multiplier of the preferred embodiment operates at a frequency of about one megahertz.

It will also be understood by those skilled in the art that a fault in a particular row of a multiplier 10 can be easily isolated by encoding the multiplicand to selectively bypass one of each of the rows during a series of multiplications. The multiplication operation which provides the correct data identifies the row with the fault since it is the row bypassed during the operation.

Although the present invention provides a major power savings in the multiplier by the techniques described above, other power savings techniques should be possible, such as having the power dependent on both the A and B data. Also, where one of A or B is constant, for example filter coefficients, it should be possible to program the multiplier to perform NOOP operations directly without having to perform the Booth encoding and related gating processes.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein.

What is claimed is:

1. A digital multiplier having an array of computational units arranged in rows and columns characterized in that the multiplication operation involves calculations which progresses in a first direction across a plurality of said rows, and wherein, depending on input data to said digital multiplier, some row calculations are suppressed in that the calculations in said suppressed row are not made, and output data from a row previous to said suppressed row are used in calculations of a row after said suppressed row.

2. The digital multiplier set forth in claim 1 wherein if two of said suppressed rows occur in a sequence in said first direction, the data from a row which is not suppressed which is a first such row immediately prior to said two suppressed rows is used in a calculation of a row which is not suppressed and which is immediately subsequent to said two suppressed rows.

3. The digital multiplier set forth in claim 1 wherein said computational units operate in an iterative manner such that each of said computational units provides a data valid signal to another of said computational units to enable a sequential operation of said computational units.

4. The digital multiplier set forth in claim 1 wherein each of said computational units receives a true and bitwise complement of a portion of multiplier data, and where in said digital multiplier further includes a carry propagate adder circuit coupled between outputs of said array of computational units, said multiplier data, and output terminals of said digital multiplier.

5. A method for digitally multiplying a multiplicand by a multiplier in an array of computational units arranged in rows and columns to produce a product comprising the steps of:
   a) proceeding with calculations which progress in a first direction across a plurality of said rows; and depending on multiplicand data
      i) suppressing some row calculations such that calculations in said suppressed row are not made, and
      ii) using data from a row previous to said suppressed row in a calculation of a row after said suppressed row.

6. The method set forth in claim 5 wherein if two of said suppressed rows occur in sequence, data from a first row previous to said suppressed rows which is not suppressed is used in a calculation of a first row subsequent to said suppressed row which is not suppressed.

7. The method set forth in claim 5 wherein in each of said rows which have not been suppressed, proceeding from a first side in said each of said rows to an opposite side in said each of said rows in an iterative manner such that each of said computational units provides a data valid signal to enable a next sequential computational unit.

8. In a digital multiplier having sequential row operation from a first row to a last row of a series of rows, the improvement comprising a plurality of multiplexers between two adjacent rows of said series of rows, each of said multiplexers having a first set of inputs coupled to an output of a row immediately previous to said multiplexer and a second set of inputs coupled to an output of a second previous row to said multiplexer, and an output coupled to an input in the next immediately successive row, and additional circuitry responsive to the multiplicand input data to said digital multiplier which has an output to said multiplexers which selects one of said first set of inputs and said second set of inputs.

9. In a digital multiplier having a series of rows, each of said rows having a plurality of computational circuitry,
   each of said plurality of computational circuitry being in a preset state before a multiplication operation begins
   the improvement comprising circitry coupled between a multiplicand and said plurality of computational circuitry in a particular row such that during a multiplication operation, each of said plurality of computational circuitry in a particular row either is held in said preset state by said circuitry or is allowed to become active to process data depending on said multiplicand.

10. The digital multiplier set forth in claim 9 wherein the power dissipated in each one of said computational circuitry is less when said one of said computational circuitry is held in a preset condition compared to the power dissipated in said one of said computational circuitry when said one of said computational circuitry is allowed to become active.

11. The digital multiplier set forth in claim 9 wherein
   the power dissipated in each one of said computational circuitry during a first multiplication operation of said digital multiplier when said one of said computational circuitry is held in a preset state during said first multiplication operation is less
   when the multiplication operation immediately previous to said first multiplication operation results in said one of said computational circuitry being held in a preset state
   compared to the power dissipated in said one of said computational circuitry during a second multiplication operation
   when the multiplication operation immediately previous to said second multiplication operation allows said one of said computational circuitry to become active.

12. A digital multiplier which receives input data of a multiplier and a multiplicand comprising:
   a) a plurality of data cells in rows wherein a top row receives a portion of said input data of said multiplier and data derived from said input data of said multiplicand and provides output data to a next row; and,
   b) wherein each or said remaining rows receive portions of data input to, and portions of data output from, a row immediately previous to said each of said remaining rows, a portion of said input data of said multiplier, and input data derived from said input data of said multiplicand for each of said remaining rows; and,
   c) wherein said data cells in each of said remaining rows
      i) process said output data from said row immediately previous to each of said remaining rows, a portion of said input data of said multiplier, and said data derived from said input data of said multiplicand, and ignore said data input to said row immediately previous to each of said remaining rows when a predetermined portion of said input data of said multiplicand is one of plurality of bit sequences, and ii) process said input data to said row immediately previous to each of said remaining rows, a portion of said input data of said multiplier, and said data derived from said input data of said multiplicand, and ignore said data output from said row immediately previous to each of said remaining rows when a predetermined portion of said input data of said multiplicand is other than said one of plurality of bit sequences.

13. A digital multiplier having an array of cells, each of which have enable/disable inputs such that said each of said cells is active or inactive in response to the state of said enable/disable input, and a least one cell control circuit which provides said enable/disable inputs to at least one of said each of said cells in response to input data to said multiplier, and which is able, depending on said input data, to hold said at least one of said each of said cells inactive during an entire multiplication operation, and the power dissipated by each of said cells is substantially influenced by the state of said enable/disable input of each cell.

14. In a digital multiplier having an array of computational circuitry arranged in rows and columns, the improvement comprising additional circuitry which has inputs coupled to a portion of the input data to said digital multiplier, and having at least one output signal which selectively suppresses a subset of said computational circuitry such that said subset of computational circuitry are not enabled during an entire multiplication operation.

15. A digital multiplier having a plurality of cells and a cell control circuit having an input coupled to inputs of said digital multiplier and having an output to said plurality of cells wherein, depending on the input data bits of said cell control circuit, one or more of said cells is held in a preset condition during an entire multiplication operation in which others of said plurality of cells become active.

16. The digital multiplier set forth in claim 15 wherein each of said plurality of cells consists of an adder.

17. Apparatus set forth in claims 1, 2, 3, 4, 8, 9, 10, 11, 12, 13, 14, 15, or 16 wherein said multiplier is a parallel multiplier.

18. Apparatus set forth in claims 1, 2, 3, 4, 8, 9, 10, 11, 12, 13, 14, 15, or 16 wherein said multiplier is an array multiplier.

19. The method set forth in claims 5, 6, or 7 wherein said multiplier is a parallel multiplier.

20. The method set forth in claims 5, 6, or 7 wherein said multiplier is an array multiplier.

* * * * *